A. Walcott,
Circular Saw Mill.
Nº 13,342. Patented July 24, 1855.
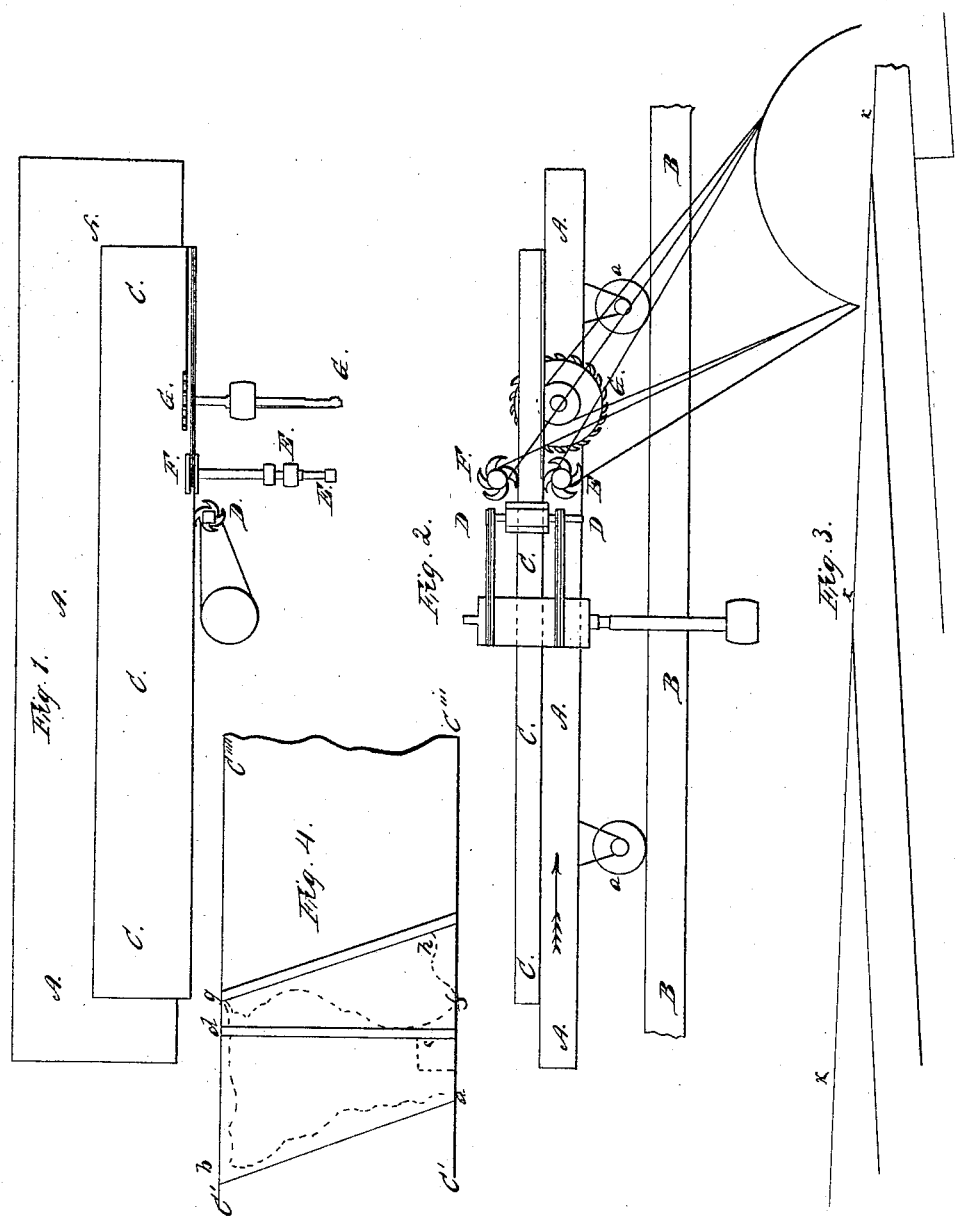

UNITED STATES PATENT OFFICE.

ALBERT WALCOTT, OF DETROIT, MICHIGAN.

MACHINE FOR DRESSING LUMBER FROM THE LOG-LUMBER.

Specification of Letters Patent No. 13,342, dated July 24, 1855.

*To all whom it may concern:*

Be it known that I, ALBERT WALCOTT, of the city of Detroit, State of Michigan, have invented a new, useful, and improved mode, method, or process in combination with the common principles of mechanism of manufacturing dressed lumber or other purposes.

The nature and principle of my invention consists in the planing, tonguing and grooving, matching or otherwise dressing in the solid timber before sawing or in connection with sawing after the logs have been sawed into cants or thick plank of the desired thickness to make the width of the desired dressed stuff, or in other words the dressing and sawing at the same time, the dressing only preceding the sawing by the distance between the dressing machinery and the saw as the cants or plank are moved forward past the dressing machinery first and then the saw in the manner set forth in describing the operation or any other manner substantially the same at one and the same time on one and the same machine.

The first process in the operation as I have before stated consists in sawing into cants or plank of the desired thickness to make the required width of dressed stuff (these may be seasoned or not before using).

The second process is to place one of such cants or plank on some kind of a carriage which may be made to traverse in a direct line without variation as near as possible by machinery forward and backward something more than twice the length of the stuff to be manufactured in a similar manner to the common siding mill for sawing siding now in use. We will suppose for illustration that such a carriage is represented in sketches Figures 1 and 2 by the letters A A A on wheels *a a* traversing on ways B B B in the direction of the arrow which we will call forward motion or direction forward. On this carriage is placed the cant or plank C C C C C C. Fig. 2 represents the edge or thickness of said cant or plank, said cant or plank projecting over the side of said carriage sufficient distance to be cut off any desired thickness and capable of being moved into such position repeatedly as it is sawed off. By the outside of said carriage way is placed in a stationary frame cylindrical rotary cutters or knives D D the shaft of which is in a vertical position and is driven with great velocity by a counter shaft which may be driven from above or below the floor. The upper side of the floor may be represented by the lower line of B B B. Such a cutting or dressing cylinder is represented at D D. The cant or plank C C C and the cylindrical cutters D D, are in such a position that the cutters will dress off a shaving or smooth the surface C C C, Fig. 2, as it traverses in the direction of the arrow as above described. Directly forward of the cylindrical cutters D D are placed matching heads, saw or cutters E and F for tonguing and grooving which are hung on horizontal arbors in the same stationary frame as above mentioned dressing cylinder and capable of being set in any desirable position which are set to tongue and groove one on the upper side of the cant or plank C C C and the other on the lower side in a suitable manner for properly matching dressed lumber when sawed off. Just forward of the heads for tonguing and grooving is placed in the same stationary frame as above described the circular saw G on a horizontal arbor.

It will be seen at a glance if the carriage is moved in the direction of the arrow and the cylindrical cutters have a rapid rotary motion and in position will plane the surface C C C, Fig. 2; it is also perfectly plain the tonguing and grooving heads or saw or cutters E and F if placed in position will tongue and groove the upper and lower sides of the cant or plank C C C which will be the edges of the dressed stuff when sawed off by the circular saw G; it is also plain said saw will cut off said dressed lumber and that the above will be the result when the carriage is moved forward and the above named cutters and saw are in motion.

When the carriage has moved a sufficient distance to pass the saw the dressed piece of lumber (which may be of any desirable width or thickness) will have been cut off and will drop down and the carriage may be returned to a position back of the cylindrical cutters and the cant or plank be set for a second piece of dressed stuff and the same process repeated until the cant or plank C C C is used up.

The machine may be made self-operating or partially so at the option of the manufacturer, for the purpose of sawing off wormy edges from the cants or plank, also for the purpose of governing or varying the thickness of the dressed lumber and also for the purpose of sawing certain portions of said cant or plank into undressed boards or plank. If desirable the saw arbor is made to traverse in a convenient manner in the boxes or otherwise and be set by a scale of inches and parts by a lever or screw and made fast with thumb screw or bolt so that the saw may be made to cut off any desirable thickness of dressed lumber. For instance after working up so much of a cant or plank into flooring as is suitable or desirable instead of setting the cant or plank to the dressing machinery the saw is to be set out toward the cant or plank as above described, so as to cut off a board or plank as desirable. When the saw is made fast and the cant or plank is set for sawing so long as stuff is wanted without being dressed, after having cut off so much as is not desirable to dress such as the heart or knotty or rotten part into undressed stuff the saw may be replaced or moved back into its original position and the cant or plank moved up to the dressing machinery, when the machine will dress the same description of stuff as before so long as the cant or plank is suitable, according to the judgment of the operator, until it is so much used up that it would be liable to spring, when the saw may be set for the last board or two or plank without dressing, as above described.

The process for dressing or manufacturing siding or clapboards is the same as for flooring with the exception there is placed on one of the arbors for tonguing and grooving heads a plain cutter which planes or surfaces a sufficient portion of one side of the cant C C C for the edge of said piece of siding or clapboarding and on the other a cutter or saw for the purpose of cutting a bevel chamfer on the back side of the clapboard or piece of siding so that it will fit to the studding more perfectly, more fully illustrated in Fig. 3 of drawing at x x x.

The process of manufacturing ceiling is the same as flooring with the addition of beading one edge and the middle if desirable by an additional arbor and current for that purpose.

The process of manufacturing dressed base or mop boards, casings, &c., either with beads or moldings is the same with the exception of an additional arbor placed just before the saw for beading cutters or molding cutters when they cannot be fitted to the arbors of the matching heads E and F. The process is substantially the same for any description of lumber where three sides may be dressed to any desirable shape by alteration of cutters on the arbor with few exceptions. For instance where moldings are required with one edge thick and the other thin as in the case of those represented at a b c d and f g h, Fig. 4 (for the purpose of saving lumber) I extend the ways on which the carriage runs and place a second stationary frame with the cutter arbors and saw at a suitable distance from the first the same as D D E and F and G, Figs. 1 and 2. C' C'' C''' C'''', Fig. 4, represents the cross section or end view of the plank C C C, Figs. 1 and 2. The surface of the molding a b, Fig. 4, is formed on the edge of the plank by the cutter on shaft D D, Fig. 2, the surface and rabbet a c, Fig. 4, by the cutter on arbor E, Fig. 2, and the surface b d, Fig. 4, by cutter or arbor F, Fig. 2, c d, Fig. 4, line of saw cut by saw G, Fig. 2. After the molding a b c d, Fig. 4, drops off the carriage continues in motion past the second frame. The cutter or vertical shaft in second frame cuts the surface of the second molding, as f g, Fig. 4, which may vary in pattern and size and the saw in the second frame (which is capable of being set to any inclination) which cuts it off to the bevel of g h, which is the same as a, b, Fig. 4, being the bevel required for the second operation, which operations are continued until the plank is used up. By putting down side ways to return the carriages on and using three carriages the two dressing machines may be kept in nearly constant operation. Patterns can be varied to almost any extent by alteration in shape of cutters, which may be made fast to heads which may be made to slip off the arbors and others put on at pleasure.

In the process and combinations which I have described and fully set forth there are several parts which are common and used by others which I do not claim separately or in other combinations. I do not claim as my invention sawing lumber into cants or plank, the carriage or any particular construction of carriage, the cylindrical cutters or any particular construction of cutters or planes for surfacing or for tonguing, grooving, matching, rabbeting, beading or molding, neither do I claim the circular saw, as they have all been used before in other various modifications.

I do not limit myself to any precise form or arrangement of parts nor to any particular device for moving or operating them, for these may be varied to almost an unlimited extent without changing the principles of my invention as set forth. I do not limit myself to the rotary cylindrical cutters for surfacing, as cutters in the face of a wheel may be used or even stationary knife stalks used for surfacing; neither do I limit myself to the use of the circular saw for sawing off stuff, as a reciprocating saw may be used and many other similar variations may be made by any competent or skilful machinist without essential or substantial variation from the character of my invention as herein set forth and described.

What I do claim is—

The particular arrangement and combination of mechanisms for manufacturing and dressing out lumber from the log, cant or plank (as the case may be) by successive operations and in any manner substantially the same as hereinbefore set forth and described, not confining myself however to any particular arrangement of mere mechanical details or devices to effect the desired result that is a piece of lumber finished or partially so (as the case may be) for building and other purposes.

ALBERT WALCOTT.

In presence of—
J. WETMORE,
C. O. FLYNN.